United States Patent [19]

Loch

[11] Patent Number: 5,546,491
[45] Date of Patent: Aug. 13, 1996

[54] METHOD FOR PRODUCING A SPLICED CONNECTION BETWEEN TWO GROUPS OF LIGHT WAVEGUIDES

[75] Inventor: Manfred Loch, Munich, Germany

[73] Assignee: Siemens Aktiengesellschaft, Munich, Germany

[21] Appl. No.: 491,606

[22] Filed: Jun. 16, 1995

[30] Foreign Application Priority Data

Jun. 27, 1994 [DE] Germany ............... 44 22 362.5

[51] Int. Cl.⁶ ..................................... G02B 6/255
[52] U.S. Cl. ............................. 385/99; 385/98
[58] Field of Search ............................ 385/95–99

[56] References Cited

U.S. PATENT DOCUMENTS

| | | | |
|---|---|---|---|
| 4,715,876 | 12/1987 | Osaka et al. | 385/96 X |
| 4,725,297 | 2/1988 | Grigsby et al. | 385/98 X |
| 4,778,242 | 10/1988 | Ota et al. | 385/99 X |
| 4,812,010 | 3/1989 | Osaka et al. | 385/99 X |

FOREIGN PATENT DOCUMENTS

| | | |
|---|---|---|
| 0278423 | 6/1993 | European Pat. Off. . |
| 4006799 | 9/1991 | Germany . |
| 63-194208 | 8/1988 | Japan ............... 385/99 |

Primary Examiner—John D. Lee
Attorney, Agent, or Firm—Hill, Steadman & Simpson

[57] ABSTRACT

A method of joining two groups of light waveguides in a splicing appliance, which includes applying a mechanical reinforcing carrier member between the two parts subsequent to the splicing operation and prior to removing the spliced waveguides from the splicing appliance.

14 Claims, 2 Drawing Sheets

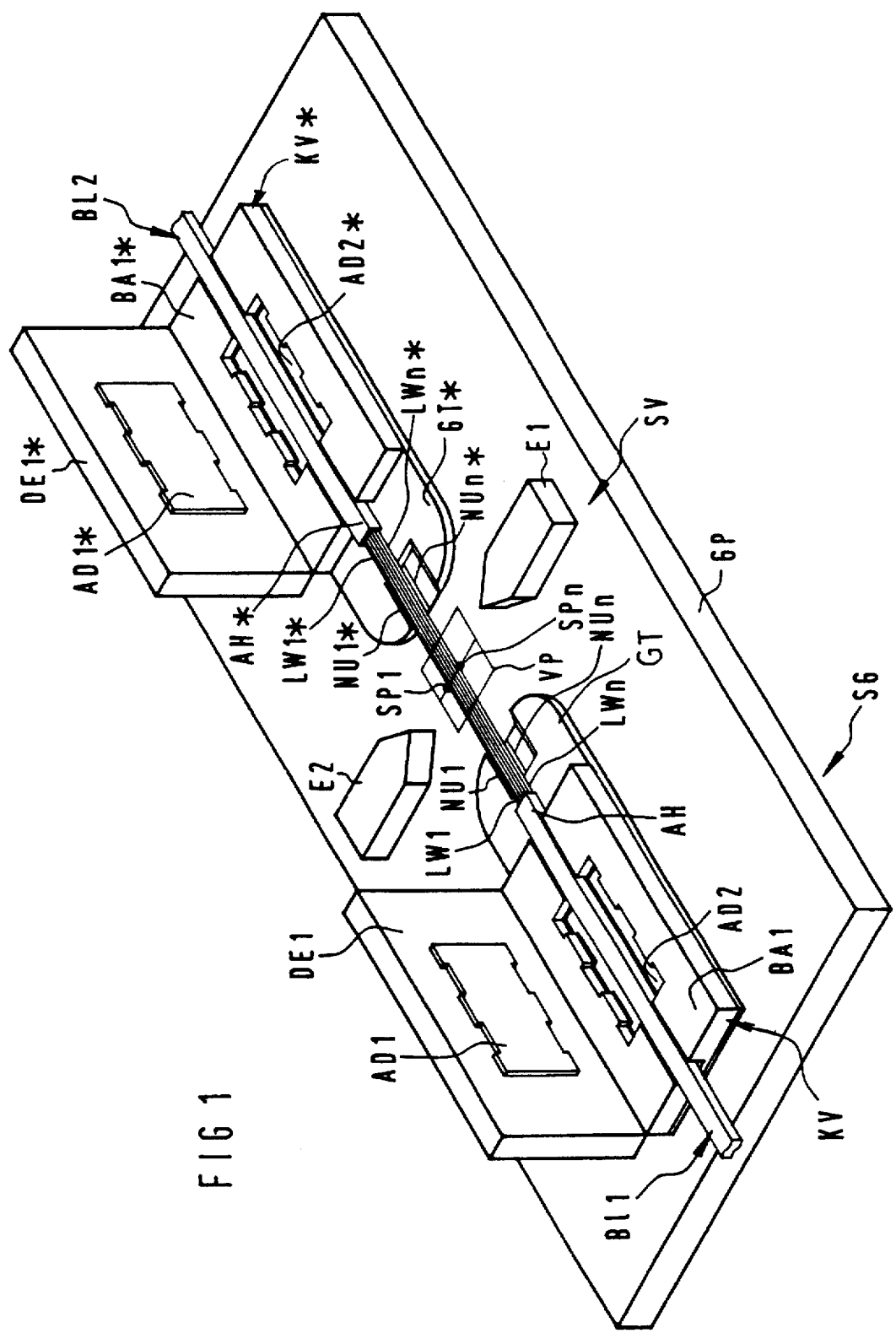

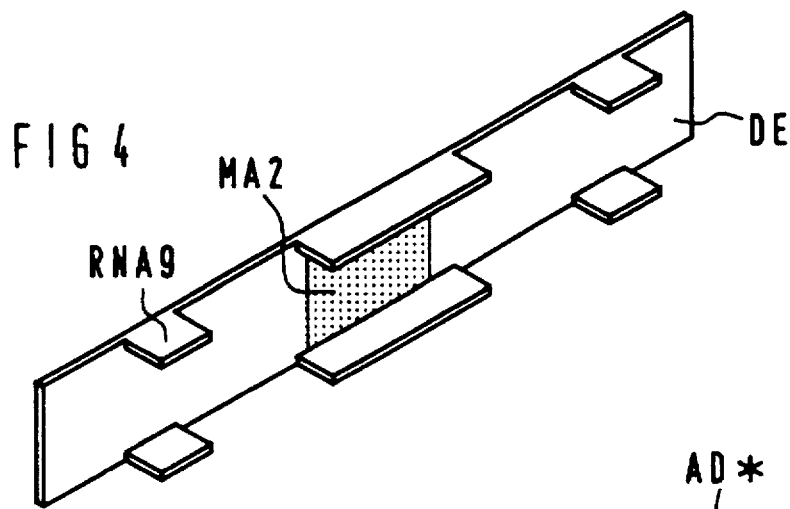
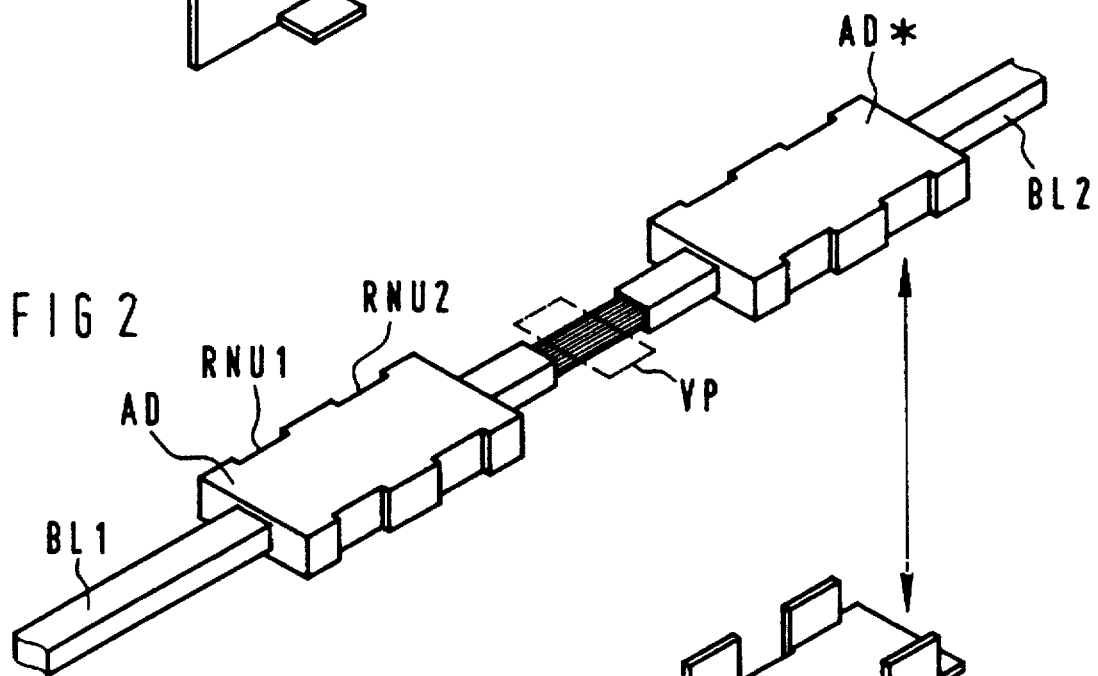
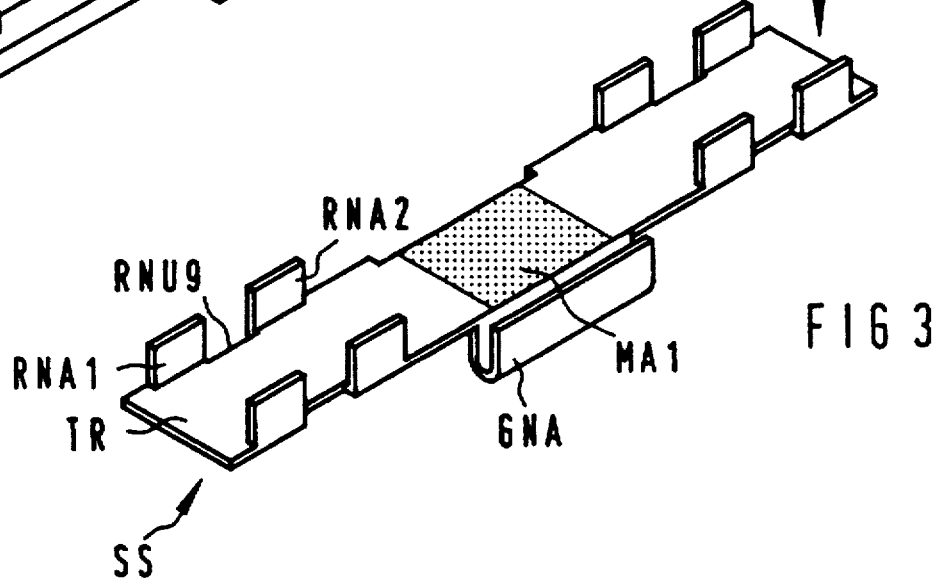

1

METHOD FOR PRODUCING A SPLICED CONNECTION BETWEEN TWO GROUPS OF LIGHT WAVEGUIDES

BACKGROUND OF THE INVENTION

The present invention is directed to a method for producing a spliced connection between two groups of light waveguides, wherein the two groups are connected to one another upon employment of a splicing mechanism at their joint location and wherein the two groups are removed from the splice device and their finished joint location is surrounded with a splice protection.

German OS 40 06 799 discloses a method wherein two groups of light waveguides are received in clamp collets and, after welding the two groups together by a welding means, the collets are removed together with the light waveguides which they hold. After this, the weld connections of the two groups of light waveguides are placed into a covering means and only there are they provided with a protective housing or splice protection. This method has a risk that the weld location will be inadmissibly mechanically stressed upon removal from the welding mechanism and, thus, will be damaged.

European Published Application 0 278 423 discloses a fusing welding process wherein the end sections of two groups of optical fibers are respectively clamped by a clamp mechanism, are welded to one another and are then removed from their fusion welding means and only then are the welded connections collectively reinforced in a reinforcing means. Since the connections of the two groups of light waveguides are directly unprotected during and/or after the removal from the welding means, inadmissible stresses on the weld connections can occur.

SUMMARY OF THE INVENTION

The object of the present invention is to provide a way for spliced connections between two groups of light waveguides to be reliably produced and retained in a simple manner. In the invention of the present application, this object is achieved in that the two groups are mechanically reinforced with a carrier element in a longitudinal direction across the joint location before removal of the connection between the two groups of light waveguides from the splicing appliance. Thus, mechanically reinforced, the stresses of the joint location are already avoided to a far-reaching extent with the carrier element upon the removal of the waveguides from the splicing device.

In that the two groups of light waveguides are mechanically reinforced across the joint location in the region of their joint location immediately after the splicing process, i.e., before removal of the two groups, uncontrolled stresses on the joint location are largely avoided. Upon removal of the two groups of light waveguides from the welding means, namely their single or multiple joint location is, additionally, stabilized by the carrier element; for example, steps have been taken to provide for a rigid receptacle or, respectively, guidance across the respective joint location. Thus, uncontrolled stresses on the respective spliced connection due to potential tensile, compressive or torsional forces are largely avoided. A securing of the respective splice location is, thus, already achieved immediately after the welding process, and this largely assures a reliable, as well as a simple, manipulation of the two groups of light waveguides when they are further processed.

Other advantages and features of the invention will be readily apparent from the following description of the preferred embodiments, the drawings and claims.

BRIEF DESCRIPTION OF THE DRAWINGS

FIG. 1 is a perspective view of a splicing mechanism in accordance with the present invention;

FIG. 2 shows the condition of the two groups of waveguides after the joining, but prior to removal from the splicing device, with the device not illustrated for purposes of illustration;

FIG. 3 is a perspective view of a carrier element for assembly on the spliced connection; and FIG. 4 is a perspective view of a cover element cooperating with the carrier element of FIG. 3 to form a casing around the spliced connection.

DESCRIPTION OF THE PREFERRED EMBODIMENTS

The principles of the present invention are particularly useful in a splicing mechanism, generally indicated at SV in FIG. 1, and the mechanism is illustrated as a welding device. The mechanism SV comprises a clamp mechanism KV into which a first group of light waveguides LW1–LWn with $n \geq 1$ are inserted. These light waveguides LW1–LWn are mechanically connected to one another in an exemplary embodiment of FIG. 1 in the form of a light waveguide ribbon BL1. The waveguides are, thus, embedded lying side-by-side largely parallel in a plastic outer sheath AH having an approximately rectangular cross section. Of course, the light waveguides LW1–LWn can also be loosely placed roughly parallel side-by-side into the clamp mechanism KV, i.e., and not be connected to one another. The clamp mechanism KV is preferably formed by the nesting of two adapter systems:

1. A base part BA1 having an appertaining cover DE1 as an outer adapter system; and
2. A plain adapter having an upper adapter part AD1 and a lower adapter part AD2 as an inner adapter system.

The clamp mechanism KV comprises a base part BA1 that is a common part of the splicing mechanism SV. This is schematically illustrated in FIG. 1 in that the base part BA1 is attached on a planar, flat baseplate GP of the welding device SV. The base part BA1, thus, preferably belongs to the splicing apparatus, at which it is either permanently installed or from which it can be potentially removed. The ends of the light waveguides LW1–LWn extend from the outside sheath AH of the ribbon conductor or the light waveguide ribbon BL1 and the coating sheathes, which include both the primary and secondary coatings, are also removed from the ends of the waveguides, so that the bare waveguides, such as optical fibers, are present. In order to arrange these waveguides side-by-side parallel in a common attitudinal plane with a defined attitude for the following splicing process, a base part GT having sorting channels NU1–NUn is attached to the base part BA1 at the end thereof. These channels NU1–NUn extend in the longitudinal direction of the longitudinal axes of the light waveguides, optimally on a straight line and parallel side-by-side as far as possible. The light waveguides LW1–LWn of the multiple fiber structure of the ribbon conductor BL1 are placed into the sorting channels NU 1–NUn and, thus, respectively, assume a defined topical attitude at the end. The base part GT with the sorting channels NU1–NUn is expediently formally anchored in the splicing appliance SV.

The clamping mechanism KV is precisely connected to the base part GT via corresponding guides that have not been shown in FIG. 1 for the sake of clarity. In order to enable an adjustment or respective alignment of the light waveguides of the multiple fiber structure to be connected to one another in the splicing appliance SV, the base part BA1 can potentially be expediently displaced along the longitudinal direction of the light waveguide ribbon BL1 and/or transversely, particularly perpendicularly or orthogonally relative to the longitudinal axis thereof. The plain adapter or, respectively, handling adapter is placed within the base adapter BA1. This plain adapter comprises a lower part AD2 as well as an upper part AD1. Before introduction of the multiple fiber structure in the form of the ribbon conductor BL1, these parts are placed into corresponding recesses of the base part BA1 as well as the cover DE1. These recesses are matched to the outside shape or, respectively, outside contour of the upper part AD1, as well as of the lower part AD2 of the plain adapter, so that the upper part AD1, as well as the lower part AD2, are each, respectively held therein essentially with a form fit. When the cover DE1 is closed, i.e., hinged down onto the base part BA1, the upper part AD1, as well as the lower part AD2, are automatically secured or, respectively, clamped to the outside sheath AH1 of the ribbon conductor BL1 at both sides and are joined to form a plain adapter AD of FIG. 2 around the ribbon conductor BL1. The ribbon conductor BL1 is, thus, provided with the plain adapter AD near the stripped end sections of the fibers. The clamp action between the upper part AD1 and the lower part AD2 of the plain adapter AD can occur, for example, in that the inside thereof is provided with an adhesive tape, a layer of adhesive or some similar material. It is also equally expedient to provide corresponding mechanical latch means at the two part for the purpose of securing them to one another.

In the right half of FIG. 1, the ribbon conductor BL1 has a second group of light waveguides in the form of a ribbon conductor BL2 allocated to it. The ribbon conductor BL2 is clamped in a second clamping mechanism KV* similar to the clamping of the ribbon conductor BL1. The clamp KV* is thereby fashioned analogous to the clamp KV, wherein the reference characters have been additionally identified with an asterisk in order to better distinguish between the two groups of components.

The group of light waveguides LW1-LWn and, respectively, LW1*-LWn*, which are to be spliced together, particularly by welding to one another, are preferably freed of their coating materials, such as light waveguide coatings, at their ends. The two groups LW1-LWn as well as LW1*-LWn* are aligned with their end faces against one another so that the light waveguide pairs LW1/LW1*, LW2/LW2*, . . . LWn/LWn* are formed. These corresponding light waveguides are moved toward one another until they approximately touch and are subsequently fusion-welded to one another collectively or individually with electrodes E1, E2. A multiple weld connection point VP is thus formed that contains n individual connections SP1-SPn between, respectively, two corresponding light waveguides LW1/LW1*, LW2/LW2*, . . . LWn/LWn* allocated to one another. For the sake of clarity, the multiple connection point VP of FIG. 1 is indicated by a square and in FIG. 2 is indicated by a dot-dash border. The electrodes E1 and E2 are arranged on the baseplate GP of the splicing mechanism SV and are aligned to extend transaxially, preferably perpendicularly relative to a straight-line longitudinal extent of the light waveguide pairs, such as LW1/LW1*, LW2/LW2*, . . . LWn/LWn* and reside opposite one another on an imaginary straight-line connecting line.

It can also be expedient to implement the spliced connection as a plug-type connection, glued connection or other type.

After the splicing process, the covers DE1 and DE1 * of the two clamp mechanisms KV and KV* are opened. A plain adapter AD or, respectively, AD* as clamp part thereby respectively remains at both sides, i.e., to the right and to the left of the multiple spliced location or spliced connection VP, remaining on an outside sheath AH or AH* of the ribbon conductors BL1 and BL2.

Before the two groups of light waveguides are now removed from the splicing appliance SV of FIG. 1, a multiple connecting point VP is mechanically reinforced in the interspace between the two clamp parts AD and AD* in a longitudinal direction and are mechanically reinforced with the assistance of a carrier element extending across the connecting point VP. This carrier element TR is shown in FIG. 3. In the simplest case, for example, it is formed by a planar, flat plate extending in a longitudinal direction of the two ribbon conductors BL1 and BL2. A longitudinal extent is preferably selected for the carrier element TR that approximately corresponds to the spacing of those end faces of the two clamp parts AD and AD* of FIG. 2 and face away from the connecting point VP from one another. Expediently, a longitudinal extent between 20 mm and 100 mm and, preferably, between 40 mm and 60 mm is selected for the carrier element. Before the removal of two groups from the splicing appliance SV of FIG. 1, the carrier part TR is preferably connected to the clamp parts AD as well as AD* which are attached on both sides of the connecting point. To this end, the operator presses the carrier part TR onto the plain adapters AD and AD* of FIG. 2 from above potentially by means of any device. The plain adapters AD and AD* are preferably joined to the carrier part TR with a simple catch or plug-in mechanism so that the spliced multiple structure is positionally secured on the carrier part TR. The carrier part TR, thus, advantageously assumes the function of a rigid guidance or, respectively, support for the two groups of light waveguides. A loading or, respectively, stressing of the sensitive multiple connecting location VP due to the potential tensile, compressive, buckling or torsional forces upon removal from the splicing appliance SV is, thus, largely avoided.

For accepting the plain adapters AD and AD* of FIG. 2, the carrier element TR in FIG. 3 comprises lateral noses or edge tongues, such as RNA1 and RNA2, particularly along the outside edge, and these engage into corresponding channels RNU1 and RNU2 on the outside edge of each of the plain adapters AD and AD*. A connection between the carrier TR and the adapters AD and AD* can preferably also be produced by gluing. The carrier element TR preferably comprises a longitudinal extent so that at least the interspace between two clamp parts or, respectively, plain adapters AD and AD* is continuously bridged in the longitudinal direction. As warranted, it can already be adequate to collectively mechanically reinforce only a sub-region around the multiple connecting point VP with the carrier part in order, in particular, to assure a mechanical relieving in the immediate area of the individual spliced connections SP1-SPn of FIG. 1. The multiple spliced connecting point VP is, thus, largely stabilized for all following processing steps, and enables significant manipulation thereof.

In the manipulation of the individual fibers LW1/LW1*, LW2/LW2*, . . . LWn/LWn*, in particular, the two plain adapters AD and AD* remaining on the ribbon conductors BL1 and BL2 largely assure that the allocation of light waveguide pairs predetermined in the splicing appliance is also preserved upon removal of the spliced multiple structure as a consequence of the combining in the plain adapters AD and AD*.

At its planar outside face facing away from the connecting point VP, the carrier element TR preferably comprises an outwardly projecting nose GNA in order to make it easy for the operator to manipulate the carrier part TR when pressing it onto the adapters AD and AD*.

By additionally attaching a cover DE, which, according to FIG. 4, comprises corresponding catch means for the carrier element TR, the unit of the adapters AD and AD*, multiple connecting point VP, as well as the carrier element TR that is now present can be expediently completed to form a splice protection all around the multiple splice point VP. The lower part of the finished splice protection is, thus, formed by the carrier TR. Expediently, the cover DE of FIG. 4 comprises catch noses RNA9 that preferably project perpendicular relative to the flat plane of the approximately rectangular strip-like cover DE on the lateral edges thereof. These noses RNA9 are engaged or plugged into channels or, respectively, lateral recesses RNU9 corresponding thereto along the edge of the carrier element TR. Of course, other standard fixing measures are also expedient for the fastening of the cover onto the carrier TR. The splice protection is completed in a way to surround the multiple connection VP on all sides. It can be expedient for durable protection against environmental influences, such as, for example, air moisture, to respectively provide the center region of the carrier element TR and of the cover DE with a durable plastic compound MA1 or MA2, respectively, at the inside aligned with one another at the location of the multiple splice point VP. These durable plastic compounds MA1 and MA2, additionally surround the bare light waveguide pairs LW1/LW1*, LW2/LW2*, . . . LWn/LWn*. In other words, the light waveguides which have been stripped of their protective coating will now be surrounded by the material MA1 and MA2. Casting resins and hot-melt glues are particularly selected as durable plastic compounds for the materials MA1 and MA2.

It can also be potentially expedient to not employ the carrier TR and the appertaining cover themselves as splice protection but only as a receptacle for the actual splice protection.

The inventive method set forth with references to FIGS. 1–4 can also be applied in an equivalent way given single-fiber splicing techniques, i.e., two light waveguides allocated to one another are spliced with one another. The base or, respectively, basic adapter BA1, BA1* of FIG. 1 inside the splicing appliance SG could thereby be potentially omitted.

In summary, the following three fundamental steps are preferably implemented for producing a reliable spliced connection between two groups of light waveguides:

1. Plain adapters AD and AD*, particularly throw-away adapters, are collectively attached and, for example are attached in common to the respective group of light waveguides. These adapters are preferably magazined and can, thus, be advantageously easily as well as quickly attached to the respective group of light waveguides. The operator can manipulate the two groups of light waveguides in a simple way with the plain adapters in this way.

2. Following the splicing process, a carrier element TR serves the purpose of removing the light waveguides. To that end, the carrier element TR is mechanically connected to the plain adapters AD and AD*. This carrier part is preferably mechanically stable so that a fixed allocation of the two adapters to one another is assured and, thus, the splice point VP is stressed only slightly or not at all insofar as possible upon removal of light waveguides.

3. The plain adapters AD and AD* and the carrier TR are preferably part of a splice protection, wherein the carrier part TR forms a lower part of the splice protection. The splice protection is completed by an upper part or cover DE.

Over and above this, the following work sequence is expedient preceding the above method steps 1–3:

1. Removal of the respective clamp mechanism KV or KV* from the splicing appliance SV.
2. Insertion of the light waveguides LW1-LWn or, respectively, LW1*-LWn* into the respective clamp mechanisms KV or KV* as ribbons or with a sorting mechanism, for example GT in FIG. 1, as loose individual fibers.
3. Insertion of the clamp mechanism KV or, respectively, KV* together with the light waveguides into the stripper means for removing the ribbon sheath as well as the light waveguide protective coatings.
4. Removal of the clamp mechanism KV or, respectively, KV* together with the stripped and exposed light waveguides from the stripper means.
5. Insertion of the clamp mechanism KV or KV* into the parting device in order to cut the end faces of the light waveguides.
6. Removal of the clamp mechanisms KV and KV* together with the light waveguides LW1–LWn or LW1*–LWn* from the parting device.
7. Insertion of the clamp mechanism KV or KV* together with the prepared light waveguides into the splicing appliance SV.

The inventive procedure advantageously allows simple as well as reliable handling as well as a further processing of the corresponding light waveguides spliced to one another. Uncontrolled tensile, bending, buckling or torsional stresses of the respective individual light waveguide connections are, thus, largely avoided. In particular, a twisting or turning of the light waveguides connected to one another is opposed in the region of the respective joint location. Moreover, it is advantageous that a fixed allocation of the corresponding light waveguides to one another is present. The mechanical reinforcement of the joint location VP by the carrier TR advantageously sees to it that the fibers are always guided parallel side-by-side in the region of the individual splice location. As a result thereof, the spliced connection of the optical fibers removed from their coating, which includes both the primary and secondary coating, can also not touch or cross in an inadmissible way which would potentially lead to an increase in attenuation. Given what is preferably an axially symmetrical arrangement and fashioning of the components of the finished splice protection, which include the adapters AD and AD*, the carrier element TR and the cover DE, with respect to the connecting point VP, the individual connections SP1-SPn automatically lie approximately in the middle of the finished splice protection unit. Since the carrier element TR particularly serves the purpose of reliable removal of the group of light waveguides spliced to one another as well as simultaneously serving for the splice protection thereof, the production of such a spliced connection is obtained with considerable savings and time.

Although various minor modifications may be suggested by those versed in the art, it should be understood that I wish to embody within the scope of the patent granted hereon all such modifications as reasonably and properly come within the scope of my contribution to the art.

I claim:

1. In a method for producing spliced connections between two groups of light waveguides, wherein the two groups are connected to one another by finish multiple connecting points upon employment of a splicing appliance at their multiple joint location and the two groups are removed from the splicing appliance and the finished multiple connecting points are surrounded with a splice protection, the improvement comprising applying a carrier element of the splice protection to reinforce the two groups in a longitudinal direction across the multiple connecting points before removing the two groups of light waveguides from the splicing appliance so that stresses on the multiple connecting points are largely avoided during the step of removing the joined groups from the splicing appliance.

2. In a method according to claim 1, wherein, before the step of splicing, attaching clamp parts to each group of the light waveguides on both sides of the multiple connecting points.

3. In a method according to claim 2, wherein the step of applying the carrier element connects the carrier element to the clamp parts on both sides before removal of the two groups from the splicing appliance.

4. In a method according to claim 3, wherein the carrier element continuously bridges in the longitudinal direction at least the interspace between the two clamp parts.

5. In a method according to claim 2, wherein the step of applying the carrier element bridges the interspace between the two clamp parts with said carrier element.

6. In a method according to claim 2, wherein the longitudinal extent of the carrier element is selected to correspond to the spacing between the end faces of the two clamp parts attached to the groups of light waveguides on each side of the connecting points.

7. In a method according to claim 6, wherein the longitudinal extent of the carrier element is in a range of 20 mm to 100 mm.

8. In a method according to claim 6, wherein the longitudinal extent of the carrier element is in a range of 40 mm to 60 mm.

9. In a method according to claim 1, wherein a lower part of the splice protection is formed by the carrier element.

10. In a method according to claim 9, wherein, subsequent to removing the two groups and the carrier element from the splicing appliance, attaching a cover part to the carrier element to complete the splice protection.

11. In a method according to claim 10, wherein both the carrier element and the cover part are provided with durable plastic intermediate layers in the region of the connecting points so that when the cover part is attached to the carrier element, the connecting points are encased in a plastic intermediate material.

12. In a method according to claim 1, wherein the forming of the spliced connections is by welding.

13. A method of forming spliced connections between two groups of light waveguides, which includes providing two groups of light waveguides with the waveguides adjacent the ends of each group being free of any protective layer, placing the two groups of waveguides in a splicing appliance with the ends of the waveguides being aligned to extend parallel to each other in a face-to-face relationship, applying adapters to each of the groups of waveguides, joining the ends of the waveguides together to form a joint location with multiple connecting points, applying a carrier part to extend between the two adapters and to engage the two adapters, said carrier part preventing application of stress to the connecting points of the waveguides, then removing the two groups of waveguides with the two adapters and carrier part from the splicing appliance, and applying a cover part to the carrier part to complete forming a splice protection for the spliced connections.

14. A method according to claim 13, wherein the step of applying the carrier part and the cover part includes providing a durable plastic intermediate layer in the vicinity of the connecting points so that when the carrier part and cover part are joined together, the connecting points are encased in said plastic material.

* * * * *